United States Patent [19]

Morikawa et al.

[11] Patent Number: 5,669,141
[45] Date of Patent: *Sep. 23, 1997

[54] SCISSORS TYPE STEEL SHEARING APPARATUS WITH VERTICALLY DISPLACED AND ANGULARLY TILTED SHEARING ZONES AND TRANSVERSELY DISPLACED INTERLOCKING PORTIONS

[75] Inventors: Sumio Morikawa; Toshiji Ohga; Masahiro Kondoh, all of Osaka-fu, Japan

[73] Assignee: Ohyodo Diesel Co., Ltd., Osaka-fu, Japan

[*] Notice: The term of this patent shall not extend beyond the expiration date of Pat. No. 5,471,747.

[21] Appl. No.: 519,667

[22] Filed: Aug. 25, 1995

Related U.S. Application Data

[63] Continuation-in-part of Ser. No. 101,358, Aug. 3, 1993, Pat. No. 5,471,747.

[30] Foreign Application Priority Data

Jun. 16, 1993 [JP] Japan ..... 5-144448

[51] Int. Cl.⁶ ..... B25P 19/00
[52] U.S. Cl. ..... 30/134; 83/928; 144/34 E
[58] Field of Search ..... 30/134, 132, 253, 30/254, 135; 83/928, 639.1, 611; 241/101.73; 144/32 E

[56] References Cited

U.S. PATENT DOCUMENTS

| | | | |
|---|---|---|---|
| 300,031 | 6/1884 | Taft | 30/134 |
| 404,736 | 6/1889 | Sanford | 30/254 |
| 2,086,081 | 7/1937 | Hollenbeck | 30/134 |
| 3,523,365 | 8/1970 | Bengel et al. | |
| 3,626,477 | 12/1971 | Fulghum, Jr. | 144/34 E |
| 4,519,135 | 5/1985 | LaBounty | 30/134 |
| 4,616,417 | 10/1986 | Gross | 30/134 |
| 4,771,540 | 9/1988 | LaBounty | 30/134 |
| 4,776,093 | 10/1988 | Gross | 30/134 |
| 5,146,683 | 9/1992 | Morikawa et al. | 30/134 |
| 5,179,985 | 1/1993 | Pallari | 30/134 |
| 5,187,868 | 2/1993 | Hall | 30/134 |
| 5,224,268 | 7/1993 | Pemberton | 30/134 |
| 5,291,657 | 3/1994 | Morikawa et al. | 30/134 |

FOREIGN PATENT DOCUMENTS

| | | |
|---|---|---|
| 0498285 | 8/1992 | European Pat. Off. |
| 0629460 | 12/1994 | European Pat. Off. |
| 0678354 | 10/1995 | European Pat. Off. |

Primary Examiner—Maurina T. Rachuba
Attorney, Agent, or Firm—Morrison Law Firm

[57] ABSTRACT

A plurality of pairs of interengaging shearing blades on upper and lower jaws are maintained at distances and tilt angles from a reference line which separates the shearing into discretely acting zones. The distances and tilt angles produce vertical steps between ends of adjacent pairs of shearing blades relieve shearing forces to direct the shearing forces to other pairs of shearing blades, where the shearing force is needed. All shearing blades are identical and interchangeable, whereby only a single type of shearing blade must be manufactured and stocked. In addition, each of the four corners of each shearing blade is installable in a position for active operation, thereby prolonging the lives of the shearing blades. Longitudinal clearances between adjacent ends of shearing blades reduces shearing forces required as the shearing point passes off the ends of blades into the vertical steps.

9 Claims, 12 Drawing Sheets

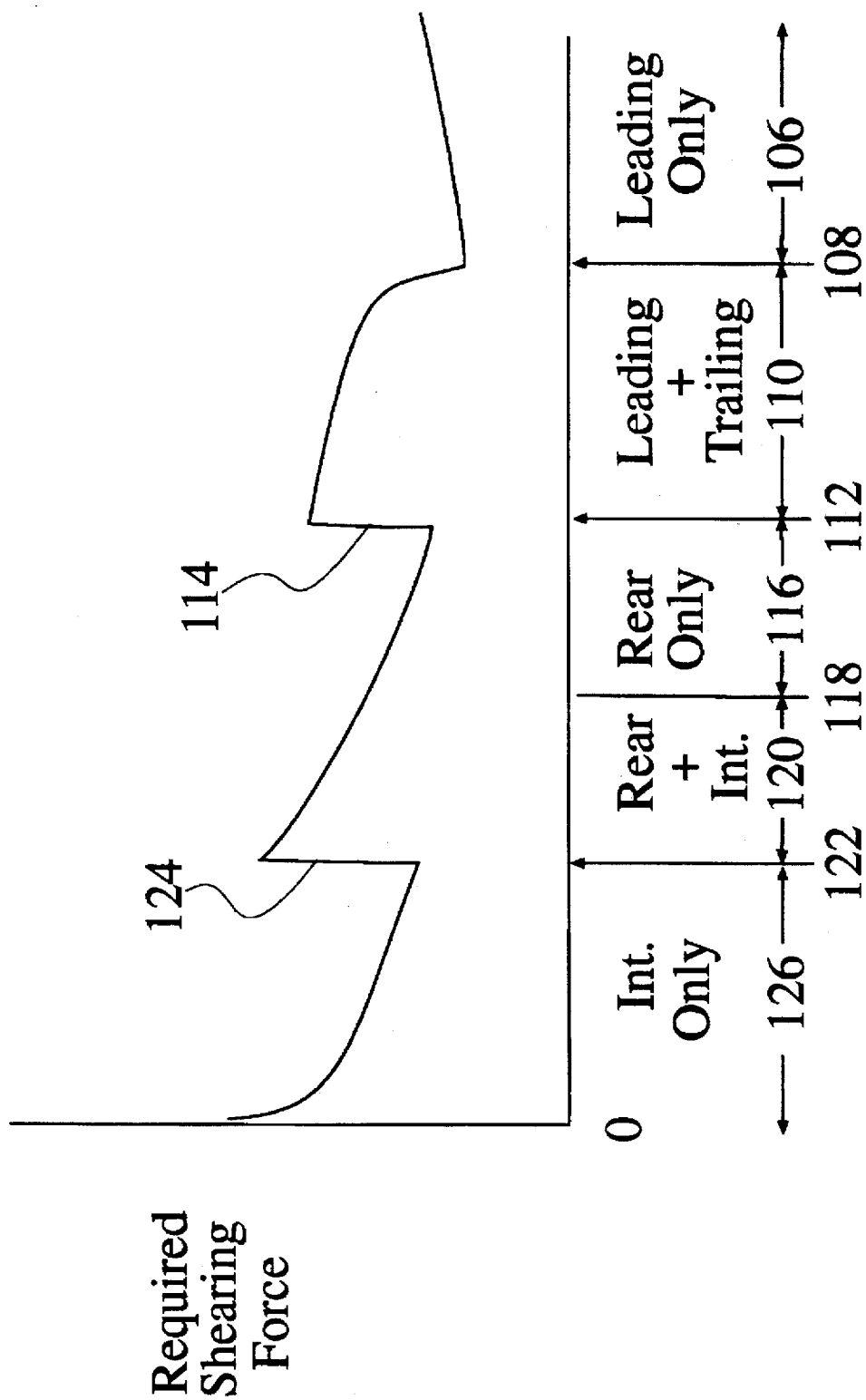

SCISSORS TYPE STEEL SHEARING APPARATUS WITH VERTICALLY DISPLACED AND ANGULARLY TILTED SHEARING ZONES AND TRANSVERSELY DISPLACED INTERLOCKING PORTIONS

This is a continuation in part of application Ser. No. 08/101,358 filed Aug. 3, 1993, now U.S. Pat. No. 5,471,747.

BACKGROUND OF THE INVENTION

This invention relates to a scissors type steel shearing machine mountable on a tip of an arm of a working machine, such as a power shovel, for shearing steel material such as, for example, bars and sheets.

Referring to FIG. 1, a power shovel 1, according to the prior art, includes a boom 50 articulated thereto. Boom 50 is rotatable in a vertical direction, while power shovel 1 is rotatable in a horizontal direction, both in a conventional manner. An arm 2 is articulated to the end of boom 50. A swivel joint 20 of a prior art steel shearing machine, shown generally at 3, is affixed at the end of arm 2.

Steel shearing machine 3 includes a lower jaw 4 and an upper jaw 5. A support shaft 6 pivotably connects a rear portion of upper jaw 5 to a rear portion of lower jaw 4. A frame 7 is rigidly affixed to lower jaw. Frame 7 extends upward past upper jaw 5. A hydraulic cylinder 10 is mounted between frame 7 and upper jaw 5. Extension and retraction of hydraulic cylinder 10 moves upper jaw 5, scissors fashion, toward and away from lower jaw 4.

Referring now also to FIG. 2, a lower shearing blade 11 is affixed to an upper edge of lower jaw 4. An upper shearing blade 12 is affixed to a lower edge of upper jaw 5. Shearing blade 12 is moved downward with upper jaw 5 by extension of hydraulic cylinder 10 into slidable shearing engagement with shearing blade 11 on lower jaw 4.

Lower shearing blade 11 is bent into a concave upward shape at an intermediate point 9. Similarly, upper shearing blade 12 is bent into a concave downward shape at an intermediate point 9.

A piece of steel material 13, between lower jaw 4 and upper jaw 5 is cut when upper jaw 5 is moved downward, scissors fashion, past lower jaw 4. Due to the concave shapes of lower and upper shearing blades 11 and 12, steel material 13 is cut inward at its forward and rearward edges at the same time. The outward displacement of intermediate points 9 prevents slippage of steel material 13 while shearing. In addition, if an edge of steel material 13 is inward of the outer tips of lower and upper shearing blades 11 and 12, steel material 13 tends to slide inward between lower and lower jaws 4 and 5, thereby moving steel material 13 into a position where a greater shearing force can be exerted upon it.

Upper shearing blade 12 include an upper leading blade 16 and an upper trailing blade 17. Similarly, lower shearing blade 11 includes a lower leading blade 14 and a lower trailing blade 15.

Referring now to FIG. 2, as upper jaw 5 is pivoted downward, the angle between upper trailing blade 17 and lower trailing blade 15 decreases more and more. Initially, a substantial crossing angle between upper trailing blade 17 and lower trailing blade 15 facilitates scissors-fashion shearing. However, as the edges of upper trailing blade 17 approach closer and closer to being parallel to lower trailing blade 15, as shown in dash-dot line in FIG. 2, a much greater force is required to shear steel material 13. When the shearing progresses inward from the rear of steel material 13 approaching intermediate points 9 the shearing force rises to a maximum.

A further problem with conventional steel shearing machine 3 is the resilient transverse spreading of lower jaw 4 and upper jaw 5 during shearing in response to a substantial component of the shearing force perpendicular to the open-close direction of the lower anti upper jaws 4 and 5. This so-called "mouth opening" phenomenon reduces the shearing ability. The mouth opening phenomenon is greatest near the forward end of the blades.

In order to avoid the above mouth opening phenomenon, U.S. Pat. No. 4,519,135 discloses a scissors-type steel shearing machine having a side plate in its lower jaw. The outer edge of the upper jaw bears against the inner edge of the side plate, thereby resisting the outward spreading tendency and thus preventing the two blades from spreading with respect to each other. To enhance this effect, the upper jaw has a beak-like projection that fits behind the side plate. An opening in the lower jaw accommodates the beak-like projection, thereby enabling full closure of the jaws.

This construction increases the complexity, cost and weight of the lower jaw. In addition, the upper jaw must move through a greater angle, thereby increasing the stroke length and size of the required hydraulic cylinder.

Referring to FIGS. 2 and 3, one solution to some of the problems in the steel shearing machine 3 of FIG. 1 includes lower leading and trailing blades 14 and 15 attached end to end on lower jaw 4. Lower leading blade 14 and lower trailing blade 15 are angled with respect to each other in a V-shaped configuration and displaced transversely relative to one another with respect to the shearing plane as shown in the drawings. The shearing plane, as used herein is a plane formed by rotating a line about support shaft 6. The pivoting motion of upper jaw 5 is parallel to the shearing plane as thus described. The transverse displacement of lower leading blade 14 with respect to lower trailing blade 15 is in a direction normal to the shearing plane. As a result of the transverse displacement, transverse forces between upper and lower leading blades 16 and 14 act in a direction opposite a the direction of transverse forces between upper and lower trailing blades 16 and 17 and 15. The opposition of these forces prevents transverse spreading or the mouth opening phenomenon.

The angle of upper leading blade 16 with respect to upper trailing blade 17 is substantially equal 10 the corresponding angle between lower leading blade 14 and lower trailing blade 15. The transverse stagger or displacement of upper leading blade 16 is substantially equal to the transverse stagger or displacement of lower leading blade 14, but is in the opposite direction whereby the left edge of upper leading blade 16 engages in shearing contact with the right edge of lower leading blade 14, while the right edge of upper trailing blade 17 engages in shearing contact with the left edge of lower trailing blade 15. Thus, the spreading tendency of the two leading blades is opposed by the simultaneous, oppositely directed, spreading tendency of the two trailing blades, whereby spreading or mouth opening is prevented.

It is also noted that the longitudinally oppositely directed inclinations of the leading blades with respect to the trailing blades prevents the steel material 13 from slipping forward in the longitudinal direction. However, the problem of high shearing forces as the two trailing blades approach parallelism remains. This high shearing force is especially severe when attempting to cut through a sheet of steel material which is wider than the depth of upper mid lower jaws 5 and 4. The maximum is reached when attempting to cut at intermediate point 9, where upper and lower trailing blades 15 and 17 are approaching parallel.

Referring to FIGS. 4 through 7, the sequence performed in shearing steel material 13 by the prior-art device of FIG. 2 is illustrated. Blades positioned in front of the shearing plane (in a direction toward the reader) are shown in solid lines, and blades positioned behind the shearing plane are shown in dashed lines.

Referring to FIG. 4, before shearing begins, a sheet of steel material 13 is placed between upper and lower leading blades 16 and 14, and between upper and lower trailing blades 17 and 15. At this point sheet of steel material 13 rests on lower leading and trailing blades 14 and 15, with upper leading and trailing blades 16 and 17 both out of contact with steel material 13.

Referring to FIG. 5, as the upper jaw (not shown) is rotated about support shaft 6, a forward portion of steel material 13 is sheared by upper and lower leading blades 16 and 14. If steel material 13 has a significant width, its rear edge is sheared simultaneously by upper and lower trailing blades 17 and 15, as shown.

Referring now to FIG. 6, shearing proceeds inward from the forward edge until it reaches intermediate point 9. At this time, due to the much shallower angle, shearing at the rear has not advanced very far toward intermediate point 9. Thus, the substantially parallel condition of upper and lower trailing blades 17 and 15 reached at this time requires a very great amount of force to proceed. That is, the shearing force on steel material 13 is not concentrated at a point on the edges of upper and lower trailing blades 17 and 15, but is spread out over the edges of the blades which rest substantially flush with the surfaces of steel material 13. Accordingly, a hydraulic cylinder 10 of normal power is incapable of completing the cut across steel material 13.

Referring now to FIG. 8, the relationship between the jaw opening angle and the required shearing force is shown. At large jaw opening angles, shown to the right in the figure, the steep shearing angles, evident in FIG. 5, require modest shearing force. As the jaw opening angle is reduced (toward the left in the figure), the required shearing force increases substantially until a point 104 is reached which corresponds to the distributed force situation of FIG. 6. At point 104, the blade crossing angle is substantially zero, thus driving the required shearing force upward almost asymptotically to the force axis.

The problem of insufficient force from hydraulic cylinder 10 can be solved by a larger or more powerful hydraulic cylinder. In practice, this is very difficult since a larger cylinder requires greater mounting space and increased structure to support its weight. Even where space is available for a more powerful hydraulic cylinder, such a solution increases the cost.

OBJECTS AND SUMMARY OF THE INVENTION

It is an object of the invention to provide a steel shearing machine which overcomes the drawbacks of the prior art.

It is a further object of the invention to provide a steel shearing machine in which segmented upper and lower shearing blades engage a piece of steel material at different times so that efficient shearing is enabled throughout the closure of an upper jaw with respect to a lower jaw.

It is a still further object of the invention to provide a steel shearing machine which includes transverse steps between leading and trailing blades, as well as vertical steps, whereby a time delay is provided between shearing at various longitudinal positions between upper and lower jaws.

It is a still further object of the invention to provide a shearing machine of relatively small size with a high shearing ability.

It is a still further object of the invention to provide a shearing machine having a plurality of identical shearing blades in which all shearing blades are interchangeable, and the blades can be rotated to make all edges useable.

Briefly stated, the present invention provides a steel shearing machine in which a plurality of pairs of interengaging shearing blades on upper and lower jaws are maintained at distances and tilt angles from a reference line which separates the shearing into discretely acting zones. The distances and tilt angles relieve vertical steps between ends of adjacent pairs of shearing blades relieve shearing forces to direct the shearing forces to other pairs of shearing blades, where the shearing force is needed. All shearing blades are identical and interchangeable, whereby only a single type of shearing blade must be manufactured and stocked. In addition, each of the four corners of each shearing blade is installable in a position for active operation, thereby prolonging the lives of the shearing blades. Longitudinal clearances between adjacent ends of shearing blades reduces shearing forces required as the shearing point passes off the ends of blades into the vertical steps.

According to the invention, a steel shearing machine includes a lower jaw and an upper jaw adapted to be opened and closed in a crossing manner with each other. A lower shearing blade is attached to the lower jaw, and an upper shearing blade is attached to the upper jaw. Each of the shearing blades is angled, at an intermediate point along the horizontal direction of the blades, outwardly in the open-closed direction of the jaws. Each of the blades are further angled, at least at a portion rearward of the intermediate point, outwardly in the open-closed direction so as to form an offset at a position adjacent to the intermediate point.

The invention also provides a steel shearing machine which comprises a lower jaw and an upper jaw adapted to be opened and closed in a crossing manner with each other. A lower shearing blade and an upper shearing blade are attached to the lower and upper jaws, respectively. Each of the shearing blades is angled at an intermediate point along the longitudinal direction of the blades, outwardly in the open-close direction of the jaws. Each of the blades is arranged in a staggered fashion so that the forward portion forward of the intermediate point and the rearward portion rearward of the intermediate point of each of the blades are disposed are opposite sides of the shearing plane. Each of the blades is further angled, at least at a portion rearward of the intermediate point, outwardly in the open-close direction so as to form an offset at a position adjacent to the intermediate point.

In an alternative embodiment, one of the blades has a gap at a position rearward of the intermediate point, while the other of the blades has a gap at a position forward of the intermediate point.

In the above shearing machine, the lower trailing blade and the upper trailing blade form a steep angle due to their inclination, so that an increased cross-angle relative to the steel material is obtained at least at a portion adjacent to the intermediate point. Furthermore, and with respect to shearing action adjacent to the intermediate point, shearing action of the leading blades occurs first. After the beginning of shearing by the leading blades, the trailing blades begin their shearing action. The angling and vertical step of the trailing blades prevent the distribution of the shearing force, thus facilitating secure shearing of the steel material, even if the material being sheared extends across the intermediate point.

According to an embodiment of the invention, there is provided a steel shearing machine comprising: an upper jaw and a lower jaw, means for articulating at least one of said upper jaw and said lower jaw with respect to the other thereof, an upper leading shearing blade on said upper jaw, an upper trailing shearing blade on said upper jaw, a lower leading shearing blade on said lower jaw, said lower leading shearing blade being engageable with said upper leading shearing blade by said means for articulating, an upper trailing shearing blade on said upper jaw, a lower trailing shearing blade on said lower jaw, said lower trailing shearing blade being engageable with said upper trailing shearing blade by said means for articulating, said lower leading shearing blade being transversely displaced in a first direction, whereby transverse forces acting thereon are directed in a first direction, said lower trailing shearing blade being transversely displaced in a second direction whereby transverse forces acting thereon are directed in a second direction substantially opposite to said first direction, whereby jaw spreading of said upper and lower jaws is prevented, at least one of said upper leading shearing blade and said lower leading shearing blade having a first shearing edge displaced a first distance from a reference line through an axis of said means for articulating, said first shearing edge having a first tilt angle with respect to said reference line, at least one of said upper trailing shearing blade and said lower trailing shearing blade having a second shearing edge displaced a second distance from said reference line, said second shearing edge having a second tilt angle with respect to said reference line, said first and second distances and said first and second tilt angles producing a vertical step between an end of said at least one leading shearing blade and an adjacent end of said at least one trailing shearing blade, and said vertical step being effective for removing a requirement for providing a shearing force to one of said leading and trailing blades for a portion of jaw closing when shearing passes said vertical step, whereby a maximum required shearing force is reduced.

According to a feature of the invention, there is provided a scissors type steel shearing apparatus comprising: an upper jaw and a lower jaw, at least first, second and third upper shearing blades on said upper jaw, at least first second and third lower shearing blades on said lower jaw, said shearing blades on said upper jaw interengaging, scissors-wise, with corresponding blades on said lower jaw, said first upper shearing blade being disposed a first distance above a reference line, said first upper shearing blade having a first tilt angle with respect to said reference line, said second upper shearing blade being disposed a second distance above said reference line, said second upper shearing blade having a second tilt angle with respect to said reference line, said third upper shearing blade being disposed a third distance above said reference line, said third upper shearing blade having a third tilt angle with respect to said reference line, said first, second and third lower shearing blades being disposed at mirror image positions relative to said first, second and third upper shearing blades, on an opposite side of said reference line, said first and second distances and said first and second tilt angles being effective to produce a first vertical step between adjacent ends of said first and second upper shearing blades, said second and third distances and said second and third tilt angles being effective to produce a second vertical step between adjacent ends of said second and third upper shearing blades, and said first and second vertical steps being positioned and directed to relieve required shearing forces at first and second predetermined portions of a shearing cycle.

According to a further feature of the invention, there is provided a steel shearing machine comprising: an upper jaw, a lower jaw, at least first and second shearing blades on said upper jaw, at least third and fourth shearing blades on said lower jaw, interoperable with said first and second shearing blades, means for removably mounting said first, second, third and fourth shearing blades on their respective jaws, each of said first, second, third and fourth blades including first, second, third and fourth corners, and said means for removably mounting including means for placing any selected one of said first, second, third and fourth corners into use as a shearing edge.

According to a still further feature of the invention, there is provided a steel shearing machine comprising: an upper jaw, a lower jaw, at least first and second shearing blades on said upper jaw, at least third and fourth shearing blades on said lower jaw, interoperable with said first and second shearing blades, means for removably mounting said first, second, third and fourth shearing blades on their respective jaws, and said first, second, third and fourth shearing blades being substantially identical, whereby said first, second, third and fourth shearing blades are interchangeable.

According to a still further feature of the invention, there is provided a steel shearing machine comprising: an upper jaw, a lower jaw, at least first and second shearing blades on said upper jaw, means for producing a first vertical step between adjacent ends of said first anti second shearing blades, a first longitudinal clearance between said adjacent ends of said first and second shearing blades, at least third and fourth shearing blades on said lower jaw, interoperable with said first and second shearing blades, means for producing a second vertical step between said adjacent ends of said third and fourth shearing blades, and said first and second longitudinal clearances being generally vertically aligned with each other.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 15 is a curve showing the required shearing force as the jaws of the shearing machine of FIG. 10 are closed.

DETAILED DESCRIPTION OF THE PREFERRED EMBODIMENTS

Figure 9:
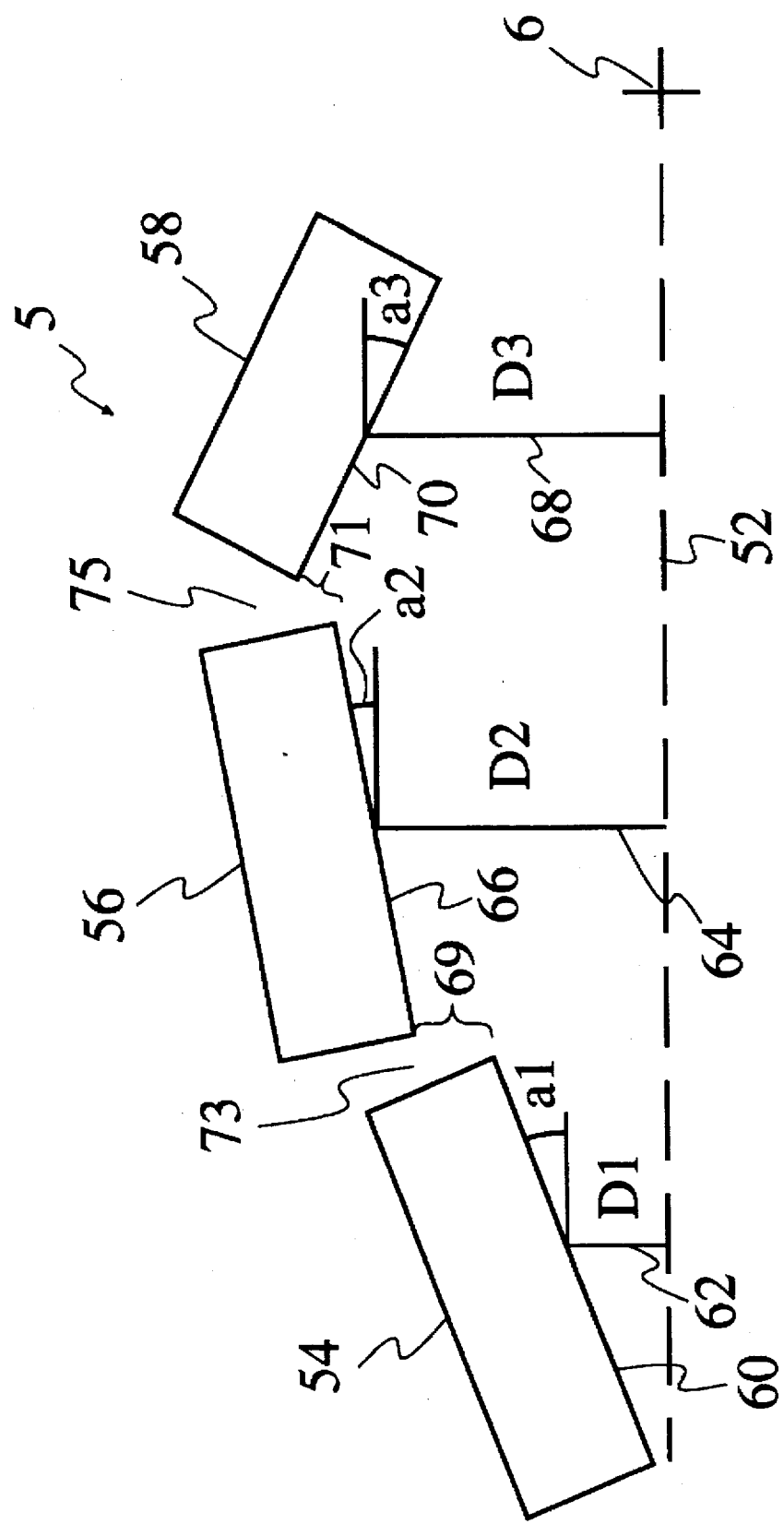
FIG. 9 is a side view of the shearing blades on the upper jaw.

Before beginning the description of the present invention, reference is made to FIG. 9 for definitions of terms which will be used in describing the invention. Distances and angles are exaggerated in FIG. 9 for purposes of illustration. A baseline 52 extends from the center of support shaft 6 to a tip of a leading shearing blade 54. A line 62 normal to baseline 52 intersects a center of leading shearing blade 54 at a distance D1. A shearing edge 60 of leading shearing blade 54 makes a tilt angle a1 with respect to baseline 52. Tilt angle a1 defines the tilt of shearing edge 60 with respect to baseline 52.

A line 64 normal to baseline 52 intersects a center of a shearing edge 66 of an intermediate shearing blade 56 at a distance D2. Shearing edge 66 makes a tilt angle a2 with respect to baseline 52.

A line 68 normal to baseline 52 intersects a shearing edge 70 of a trailing shearing blade 58 at a distance D3. Shearing edge 70 makes a tilt angle a3 with respect to baseline 52.

For purposes of the description which follows, the distances D1, D2 and D3 are referred to as vertical distances. These distances are generally parallel to the shearing plane as previously defined. The term transverse displacement refers to displacement in a direction normal to the shearing plane. That is, transverse displacement is in a direction into and out of the page in FIG. 9. The term tilt angles refers to tilt angles a1, a2 and a3. The term longitudinal is in a direction generally parallel to baseline 52.

Vertical distances D1 and D2, together with tilt angles a1 and a2, an upward vertical step 69 from the rear end or shearing edge 60 to the forward end of shearing edge 66, in the direction from the forward end leading shearing blade 54 toward support shaft 6. Similarly, vertical distances D2 and D3, together with tilt angles a2 and a3 form a further upward vertical step 71 from the rear edge of shearing edge 66 to the forward end of shearing edge 70, also in the direction from the forward end of leading shearing blade 54 toward support shaft 6.

The presence of at least one of upward vertical steps 69 and 71 are an important part or the invention. These steps produce portions or the jaw-closing cycle when two or more interacting shearing blades are temporarily taken out of operation, thereby directing all shearing force from the actuating hydraulic cylinder (not shown) to one or two interacting pair or shearing blades. In addition, when two pairs of shearing blades are engaged in the shearing process, the third pair or shearing biases can be kept clear of each other, thereby directing all force from the actuating hydraulic cylinder (not shown) to the two pairs or engaging shearing blades. In addition, the control of tilt angles a1, a2 and a3 permits tailoring the shearing angles at which the pairs of shearing blades engage each other. In this way, when two pairs of shearing blades must be active, the shearing angles can be established at high values so that the shearing forces are concentrated, rather than being distributed along a substantial length or the interacting shearing blades. If small shearing angles are unavoidable in stone jaw-opening positions, the availability of vertical steps 69 and 71 permit directing all available actuating force to the one pair or shearing blades. Also, since the shearing blades can be kept short, even when force distribution takes place, the length over which the force distribution acts is kept small.

The forward end of intermediate shearing blade 56 is longitudinally spaced rearward from the trailing end of leading shearing blade 54 to produce a longitudinal clearance or gap 73. A similar longitudinal clearance (not shown) is present in the interacting leading and intermediate shearing blades in lower jaw (not shown). The forward end of trailing shearing blade 58 is longitudinally spaced from the trailing end of intermediate shearing blade 56 to produce a longitudinal clearance or gap 75. A similar longitudinal clearance (not shown) is present in the interacting intermediate and trailing shearing blades in lower jaw (not shown)

Figure 10:
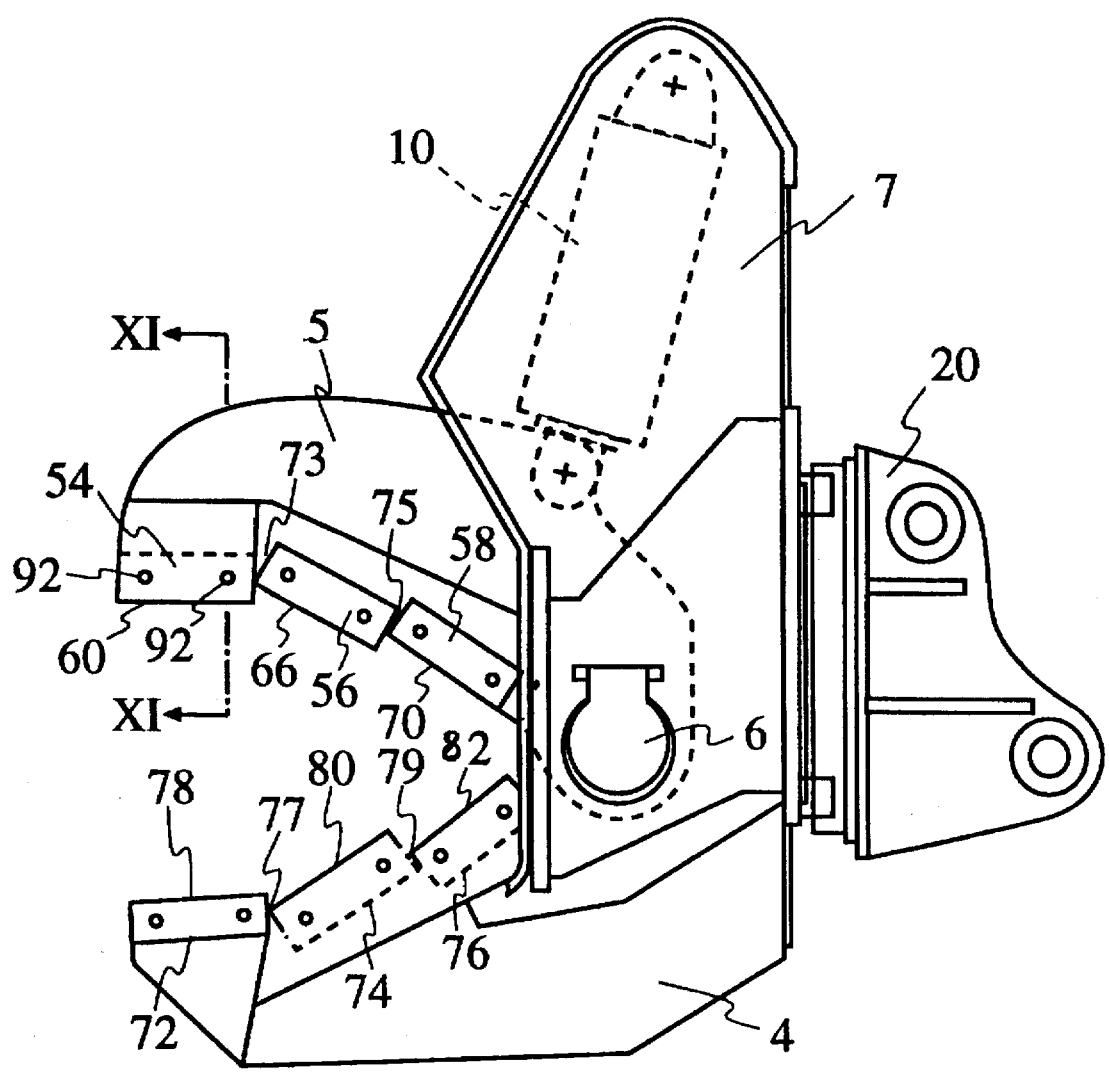
FIG. 10 is a side elevation of a steel shearing machine according to an embodiment of the invention with the jaws in an open position.

Referring now to FIG. 10, upper jaw 5 includes leading, intermediate and trailing shearing blades 54, 56 and 58, respectively, with vertical distances, tilt angles and transverse displacements as defined above. Lower jaw 4 includes leading intermediate and trailing shearing blades 72, 74 and 76, respectively. Shearing blades 72, 74 and 76 include shearing edges 78, 80 and 82, respectively in mirror image positions with respect to shearing edges 60, 66 and 70 of shearing blades 54, 56 and 58. That is, distances, tilt angles and transverse displacements of shearing blades 72, 74 and 76 are equal in magnitude, but opposite in sign from corresponding parameters of shearing blades 54, 56 and 58.

A longitudinal clearance 77 is present between adjacent ends of leading shearing blade 72 and intermediate shearing blade 74. A longitudinal clearance 79 is present between adjacent ends of intermediate shearing blade 74 and trailing shearing blade 76.

Although shearing can be perfomed without the presence or longitudinal clearances, longitudinal clearances (73, 75, 77 and 79) relieve shearing forces at times in the shearing cycle when the shearing point has just passed off the ends of interacting shearing blades. This permits other pairs of shearing blades to continue shearing without requiring substantial extra force to deform or tear the material being sheared in the vicinity of active longitudinal clearances, where shearing is not desired. The longitudinal dimensions of (longitudinal clearances (73, 75, 77 and 79) depends on the particular application. In general these clearances should be equal to a substantial fraction of the thickness of the material being sheared. That is, the thicker the material to be sheared, the greater the dimension of longitudinal clearance that is required for optimum perfomance. For thin material to be sheared, longitudinal clearances of about 10 millimeters may be sufficient. The inventor believes that longitudinal clearances of at least 10 millimeters should be present. For thick material to be sheared, longitudinal clearances of about 50 millimeters may be sufficient. That is, a range of longitudinal clearances from about 10 to about 50 millimeters is preferred. A more preferred range of longitudinal clearances is from about 20 to about 30 millimeters.

Shearing blades 56, 58 and 72 are on the sides or their respective jaws facing the observer, and are therefore shown in solid line. Shearing blades 54, 74 and 76 are on the sides of their respective jaws facing away from the observer, and are thus shown in dashed line.

Shearing blades 54, 56, 58, 72, 74 and 76 are removably mounted on their respective jaws. In addition, all shearing blades are preferably identical to minimize the manufacturing cost, and the number of blades which must be stocked by a distributor or user. The transverse cross section of each shearing blade is rectangular, with the vertices of the rectangles forming the shearing edges. The mounting of each shearing blade permits removal and remounting to bring each of its four vertices into use as the shearing edge. This extends the lives of the shearing blades. The six shearing blades shown in FIG. 10, have a total of 24 edges (6 blades times 4 edges per blade), all of which can be brought into action.

Figure 11:
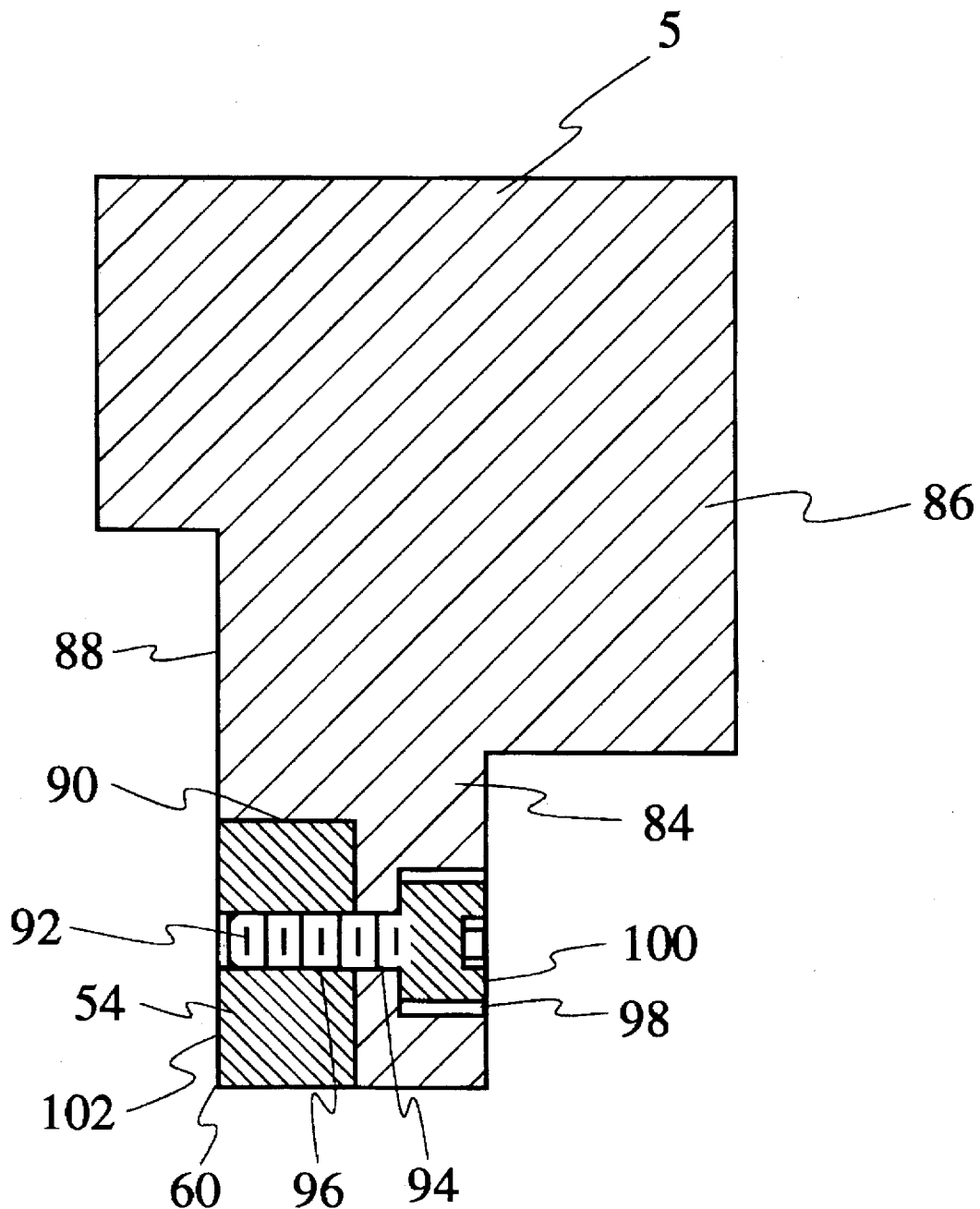
FIG. 11 is a cross section taken along XI—XI in FIG. 10

Referring now to FIG. 11, upper jaw 5 includes a generally rectangular web 84 extending downward from a main body 86. A shearing face 88 of web 84 includes a generally rectangular recess 90 in its extreme lower edge. Leading shearing blade 54 is retained in recess 90 by two bolts 92, only one of which is shown in FIG. 11, each passing through a hole 94 in web 84 and engaging threads in a threaded hole 96 in leading shearing blade 54. A countersink 98 in web 84 protects a head 100 of bolt 92. An outer face 102 of leading shearing blade 54 is coplanar with shearing face 88.

Figure 12:
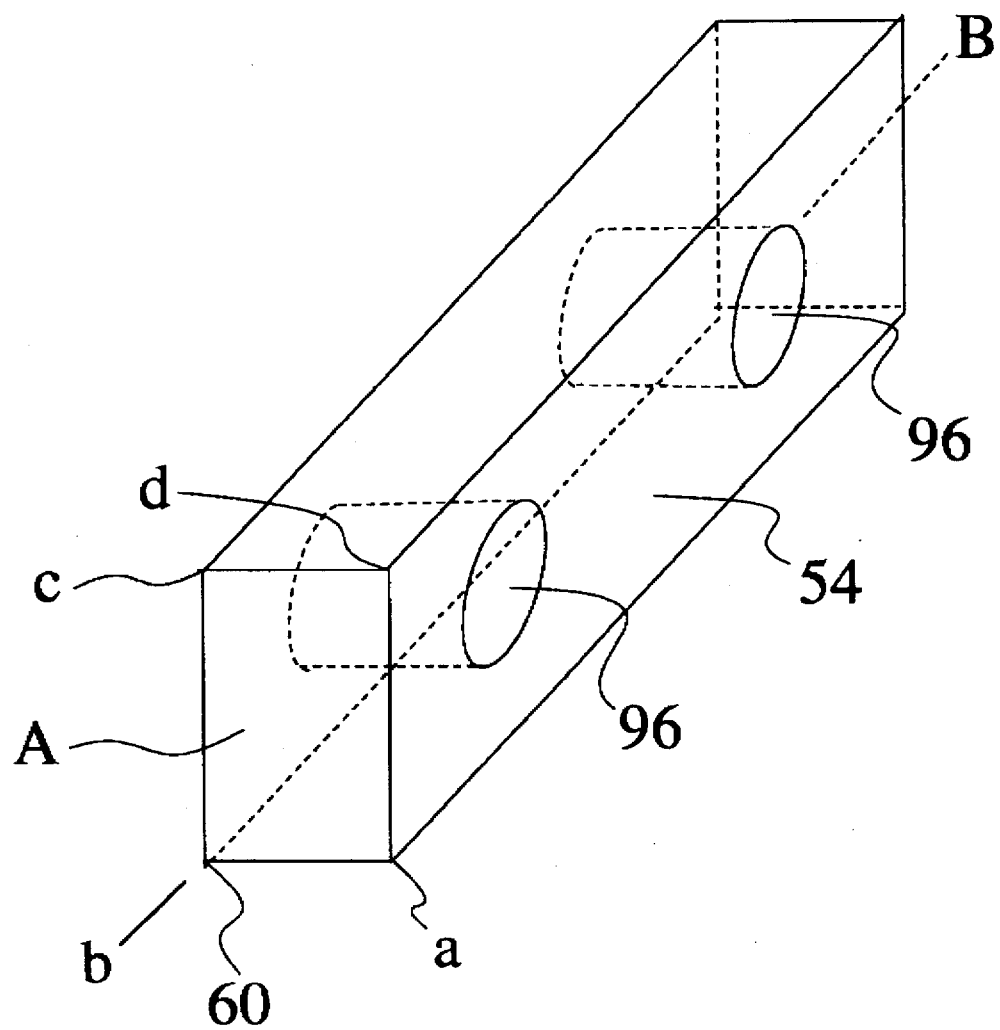
FIG. 12 is a perspective view of a shearing blade.

Referring now to FIG. 12, leading shearing blade 54 is shown removed from the remainder of upper jaw 5. End faces A and B, as well as corners a, b, c and d are identified for purposes of description. It will be noted that corner b is in the position of shearing edge 60. When corner b becomes worn, leading shearing blade 54 may be rotated 180 degrees about an axis parallel to shearing edge 60 to bring diagonally opposite corner d into the position of shearing edge 60. When corner d becomes worn, leading shearing blade may be rotated 180 degrees about an axis parallel to the axis of one of threaded holes 96, whereby the positions of end faces A and B are reversed. This places corner a in the position to act as shearing edge 60. When corner a becomes worn, leading shearing blade 54 may be rotated 180 degrees about an axis parallel to shearing edge 60 to bring corner c into position to act as shearing edge 60. In this manner, all four corners a, b, c and d are brought into use as shearing edge 60.

Returning now to FIG. 10, the remaining shearing blades 56, 58, 72, 74 and 76 are mounted to their respective jaws in the same manner as leading shearing blade 54. Due to the identical construction of the six shearing blades, their positions can be interchanged freely between positions in jaws 4 and 5. Thus, when it is found that a certain position causes the greatest amount of wear, a shearing blade from a position experiencing a lesser amount of wear can be substituted in the high-wear location. The shearing blade from the high-wear location can be substituted in the low-wear location. The result is similar to rotating of tires on the wheels or an automobile. That is, maximum life for the entire set of shearing blades is attainable by intelligent substitutions between locations.

Figure 13:
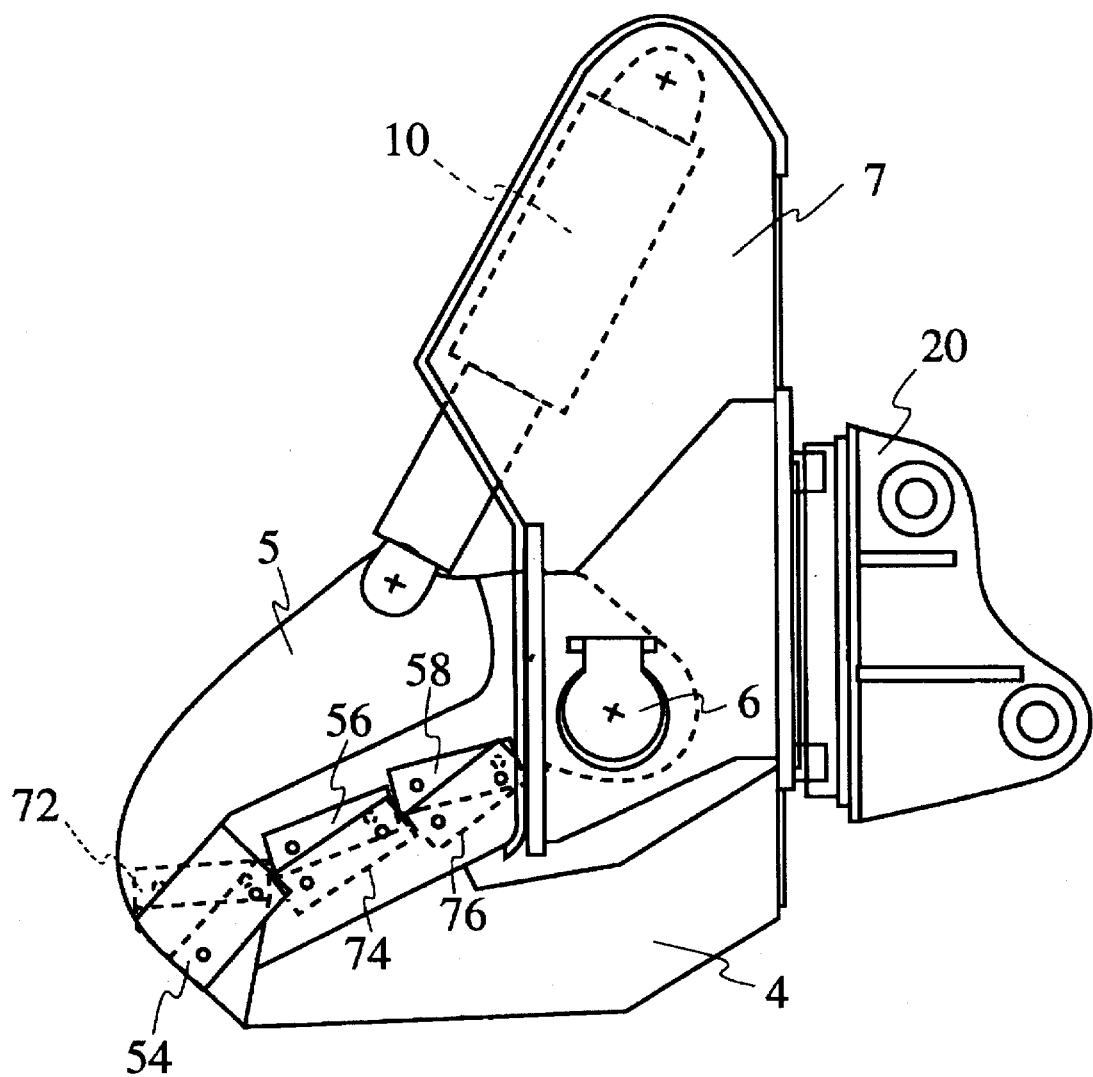
FIG. 13 is a side elevation of the steel shearing machine of FIG. 10 with the jaws in a closed position.

FIG. 10 shows the apparatus of the invention with upper jaw 5 rotated into the open position. Referring now to FIG. 13, the apparatus is shown with upper jaw 5 rotated into the fully closed position in the transition between the positions shown in FIGS. 10 and 13, various pairs of shearing blades are active, either alone, or together with another pair. At some jaw-open positions, portions of the shearing edges are held out of contact by the combination of vertical displacement and tilt angle, thereby directing additional shearing force to other shearing blades.

Figure 14:
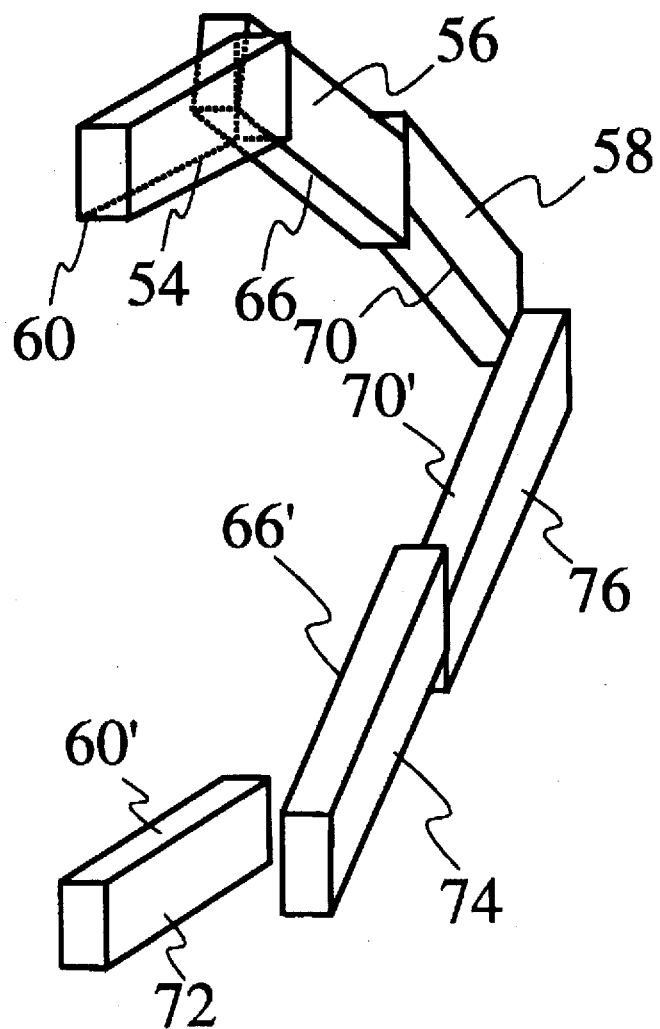
FIG. 14 is a perspective view of the shearing blades according to the present invention.

Referring now to FIG. 14, a perspective view is shown including only shearing blades 54, 56, 58, 72, 74 and 76 in the open condition of the jaws (not shown). It will be noted that lower leading shearing blade 72 is displaced transversely behind the shearing plane, and that upper leading shearing blade 54 is displaced transversely in front of the shearing plane. Shearing blades 74 and 76 are displaced transversely in front of the shearing plane, and shearing blades 56 and 58 are displaced transversely behind the shearing plane to engage shearing blades 74 and 76.

One skilled in the art will recognize that other patterns of transverse displacement may be employed without departing from the spirit and scope or the invention. For example, intermediate shearing blade 74 may also be displaced behind the shearing plane where it is transversely aligned with leading shearing blade 72. In this embodiment, intermediate shearing blade 56 is transversely displaced in front or the shearing plane. In a further embodiment or the invention, only intermediate shearing blades 56 and 74 are displaced transversely with respect to the remainder or the shearing blades. In all of the embodiments, transverse forces from one pair or shearing blades operable in the opposite direction from the transverse forces from the other two pairs of shearing blades.

Referring now to FIGS. 9 and 15, the required shearing forces in FIG. 15 are related to the portions or upper jaw 5, and lower jaw 4 (not shown), involved at any instant in the shearing operation. For the present description, it is presumed that lower jaw 4 ((not shown) is the mirror image or upper jaw 5. Initially, only leading shearing blade 54 (and its lower-jaw counterpart) contacts the steel material to be sheared. In this shearing region 106 of jaw opening, a relatively modest shearing force is required due to the steep shearing angle produced by tilt angle a1. In addition, the shearing angle of leading shearing blade 54 increases as upper jaw 5 closes, thereby further concentrating the shearing force, as indicated by a slight decline in required shearing force in shearing region 106. If the material to be sheared is free to move, the material, instead of being sheared in shearing region 106 is merely displaced deeper into jaw 5 until a rear edge or the material to be sheared contacts trailing shearing blade 58 at a point 108. At this time, both leading shearing blade 54 and trailing shearing blade 58 contact and shear the steel material. This condition continues over a shearing region 110 which, as shown, requires increasing shearing force due to the reduction in shearing angle on trailing shearing blade 58, even though an increase in shearing angle is taking place on leading shearing blade 54. Shearing takes place in the rearward direction by leading shearing blade 54 while shearing takes place in the forward direction by trailing shearing blade 58. Intermediate shearing blade 56 remains out of contact with the steel material over this range.

At a jaw-opening point 112, shearing has progressed sufficiently that the shearing point on leading shearing blade 54 has passed off the inner end or leading shearing blade 54. At this point, upward vertical step 69 opposes a similar downward vertical step (not shown) in the lower jaw. Longitudinal clearances reduce or eliminate tearing forces. Thus, the only shearing force required at this time is the much lower amount required by trailing shearing blade 58. As a result of the sudden removal or shearing force by upward vertical step 69, a step reduction 114 in the required shearing force results. For a short shearing region 116, shearing is performed only by trailing shearing blade 58. Even though the shearing angle or trailing shearing blade 58 may be quite small, the required shearing force remains modest because or the short length of trailing shearing blade 58.

At a point 118, a forward end or intermediate shearing blade 56 contacts the steel material being sheared and begins its shearing function. At point 118, the shearing angle of intermediate shearing blade 56 is relatively large because of tilt angle a2, as well as the counterclockwise additional tilt produced by rotation of upper jaw 5. The shearing angle or intermediate shearing blade 56 increases as upper jaw 5 closes, thereby reducing the required force to produce shearing by both intermediate and trailing shearing blades 56 and 58. Over a shearing region 120, both intermediate and trailing blades 56 and 58 continue shearing, with intermediate shearing blade 56 shearing in the rearward direction, and trailing shearing blade shearing in the forward direction.

At a point 122, the shearing point of forward shearing by trailing shearing blade 58 has reached the forward end of trailing shearing blade 58, bringing upward vertical step 71 into play. Upward vertical step 71 produces a further step reduction 124 in required shearing force. The longitudinal clearances between trailing shearing blade 58 and intermediate shearing blade 56, and their counterparts on lower jaw 4, reduce the tearing forces. From step reduction 124 to a fully jaw-closed position, shearing continues only with intermediate shearing blade 56 over a final shearing region 126.

Figure 1:
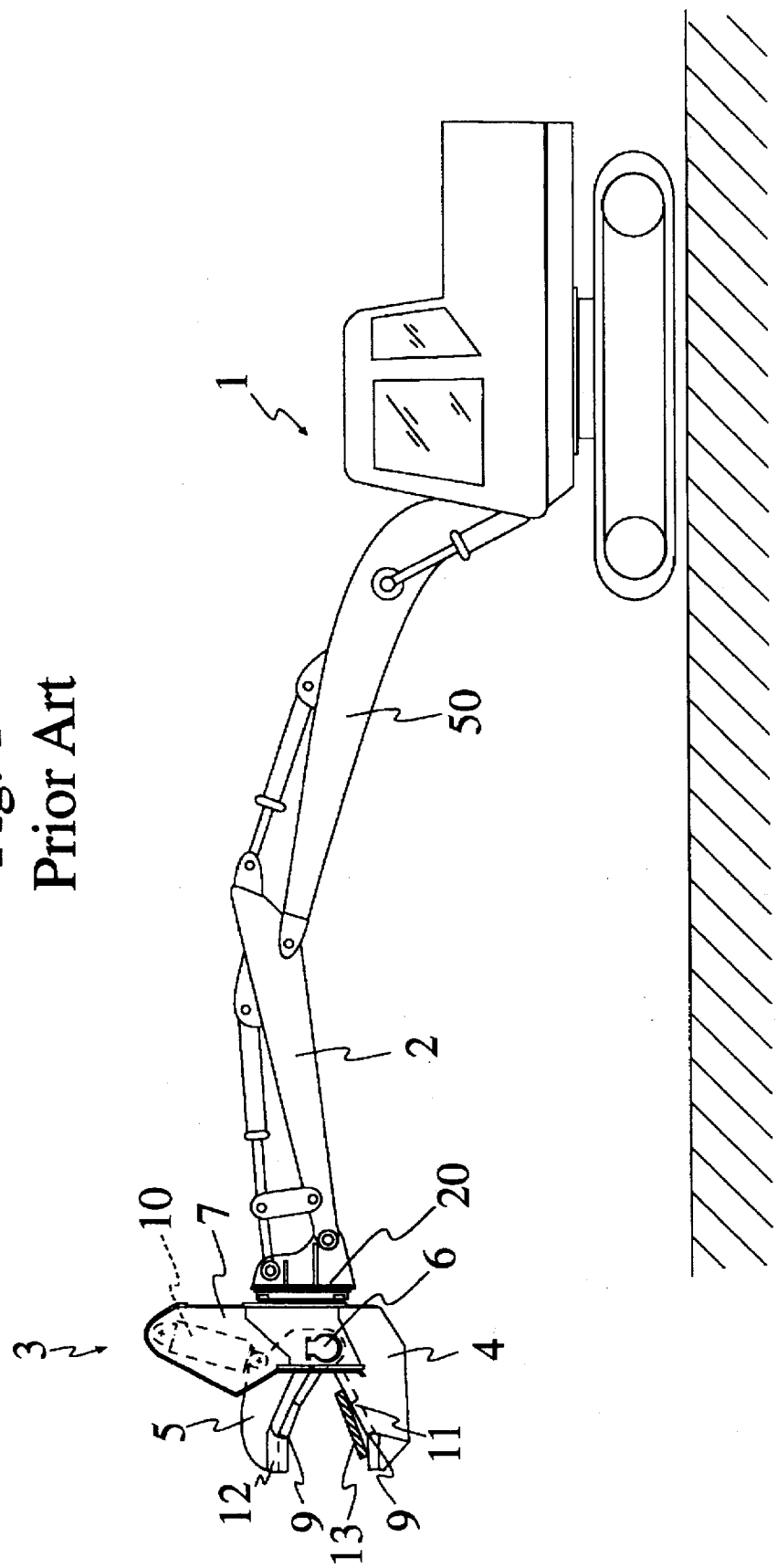
FIG. 1 is a side view of a power shovel according to the prior art.
Figure 2:
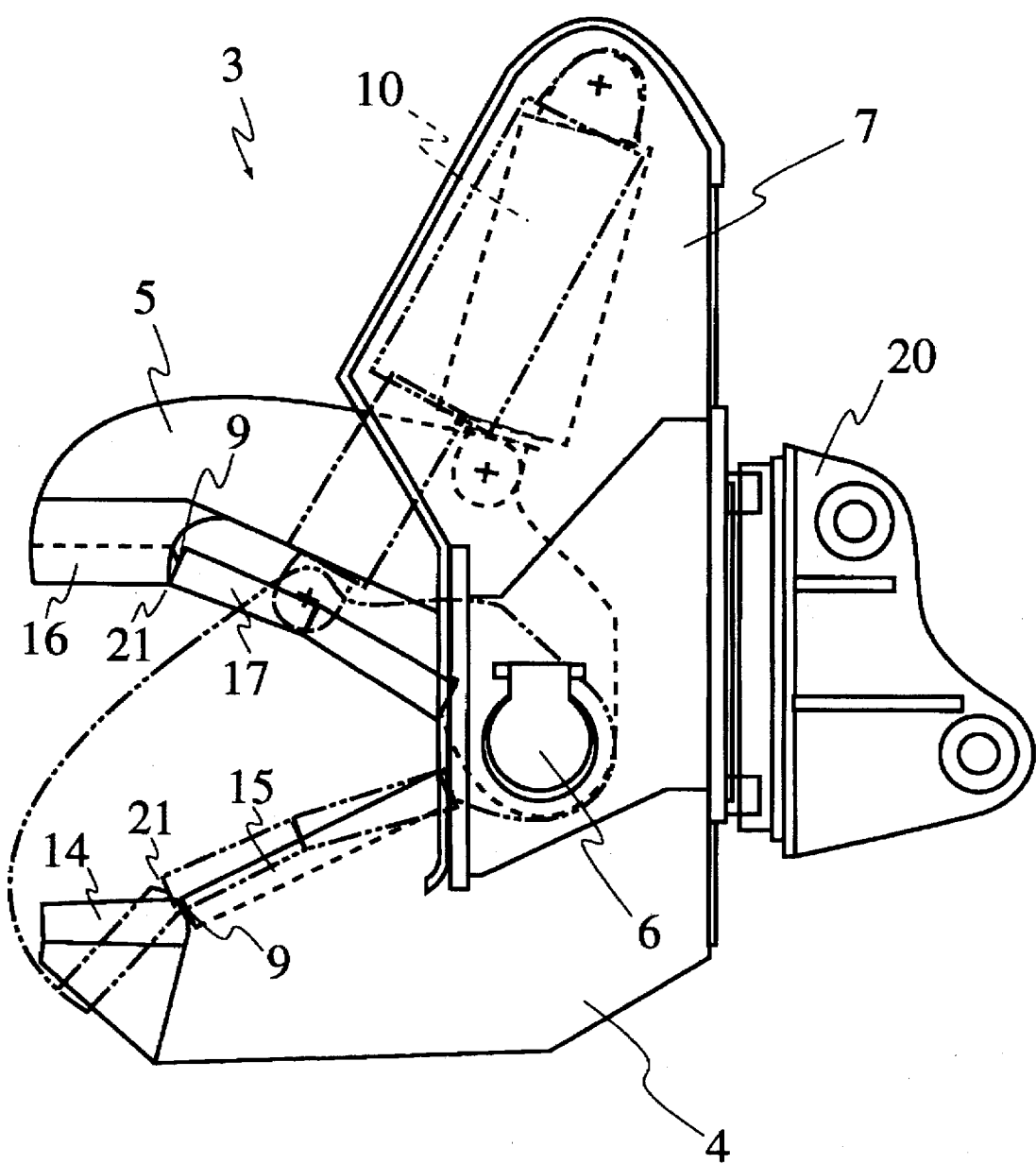
FIG. 2 is a side view of a steel shearing machine according to the prior art.
Figure 3:
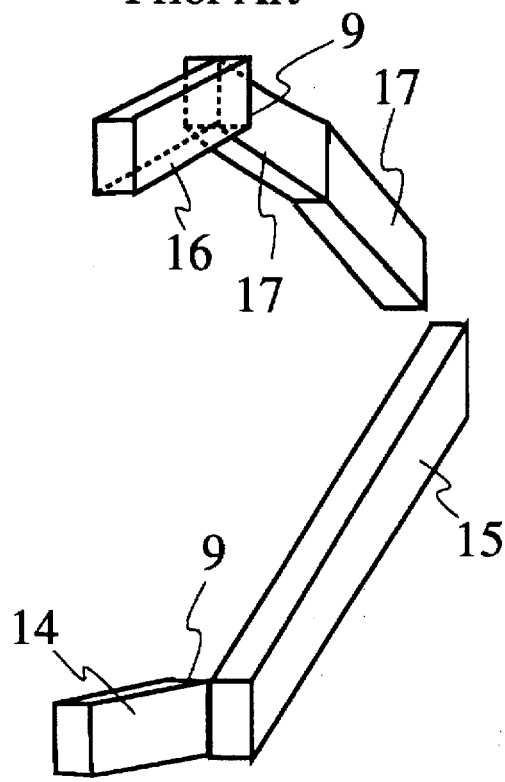
FIG. 3 is a perspective view of shearing blades of the prior-art shearing machine of FIG. 2.
Figure 4:
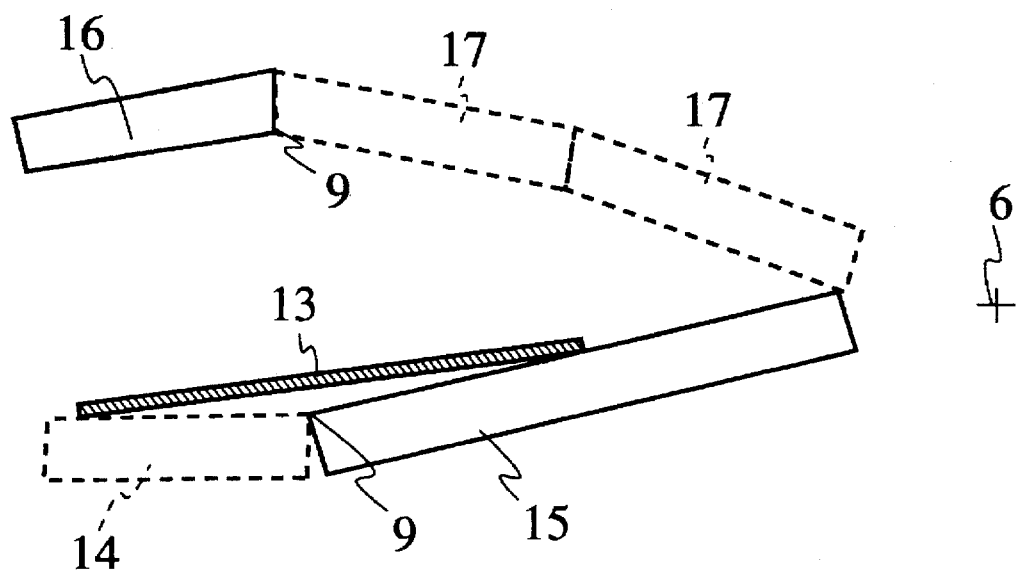
FIG. 4 is a side view of the shearing blades of FIG. 3 before beginning of shearing.
Figure 5:
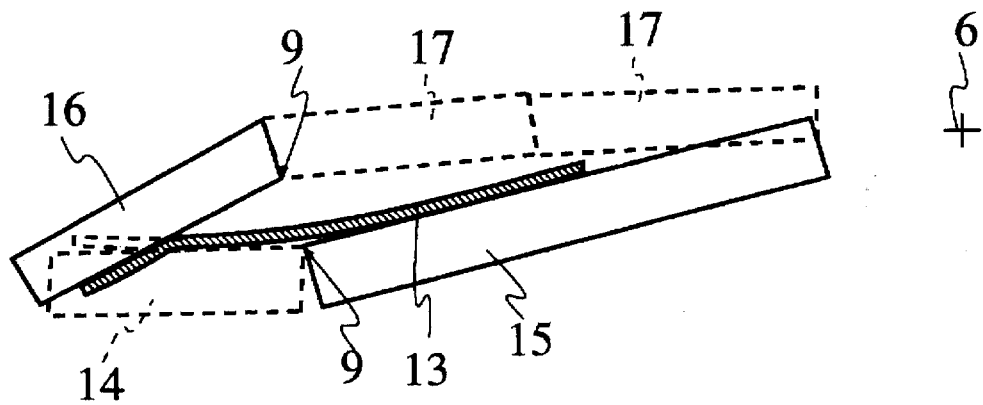
FIG. 5 is a side view of the shearing blades of FIG. 3 at the beginning of shearing.
Figure 6:
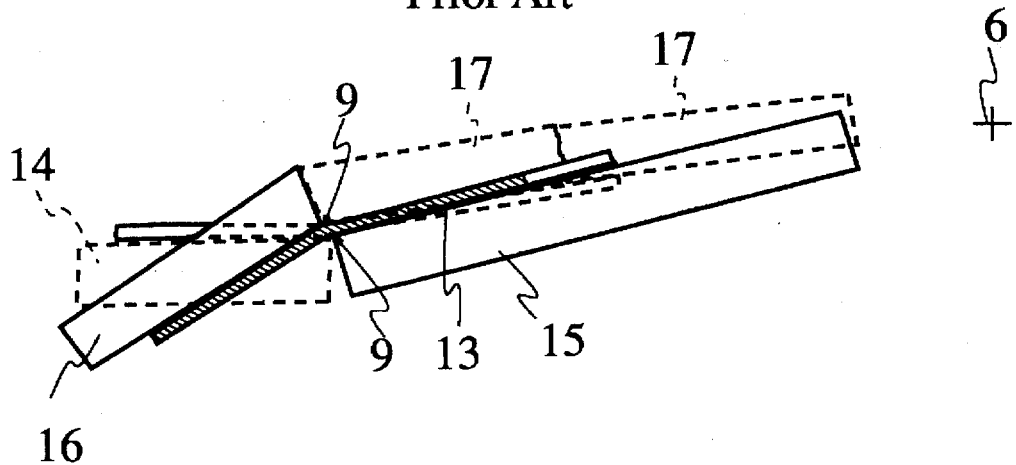
FIG. 6 is a side view corresponding to FIG. 5, but at a later stage of shearing.
Figure 7:
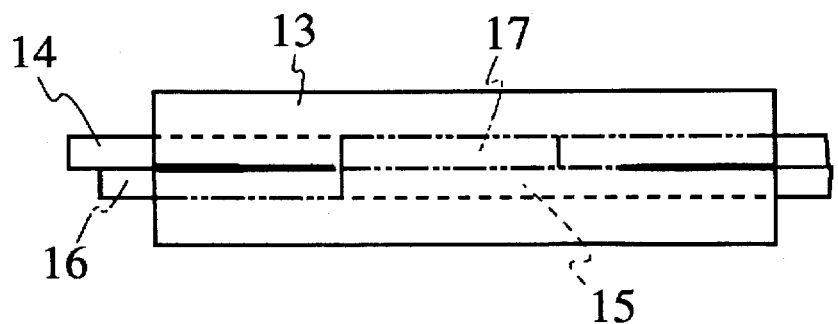
FIG. 7 is a top view of the shearing blades of FIG. 3 illustrating the transverse displacement of portions thereof for avoiding jaw spreading.
Figure 8:
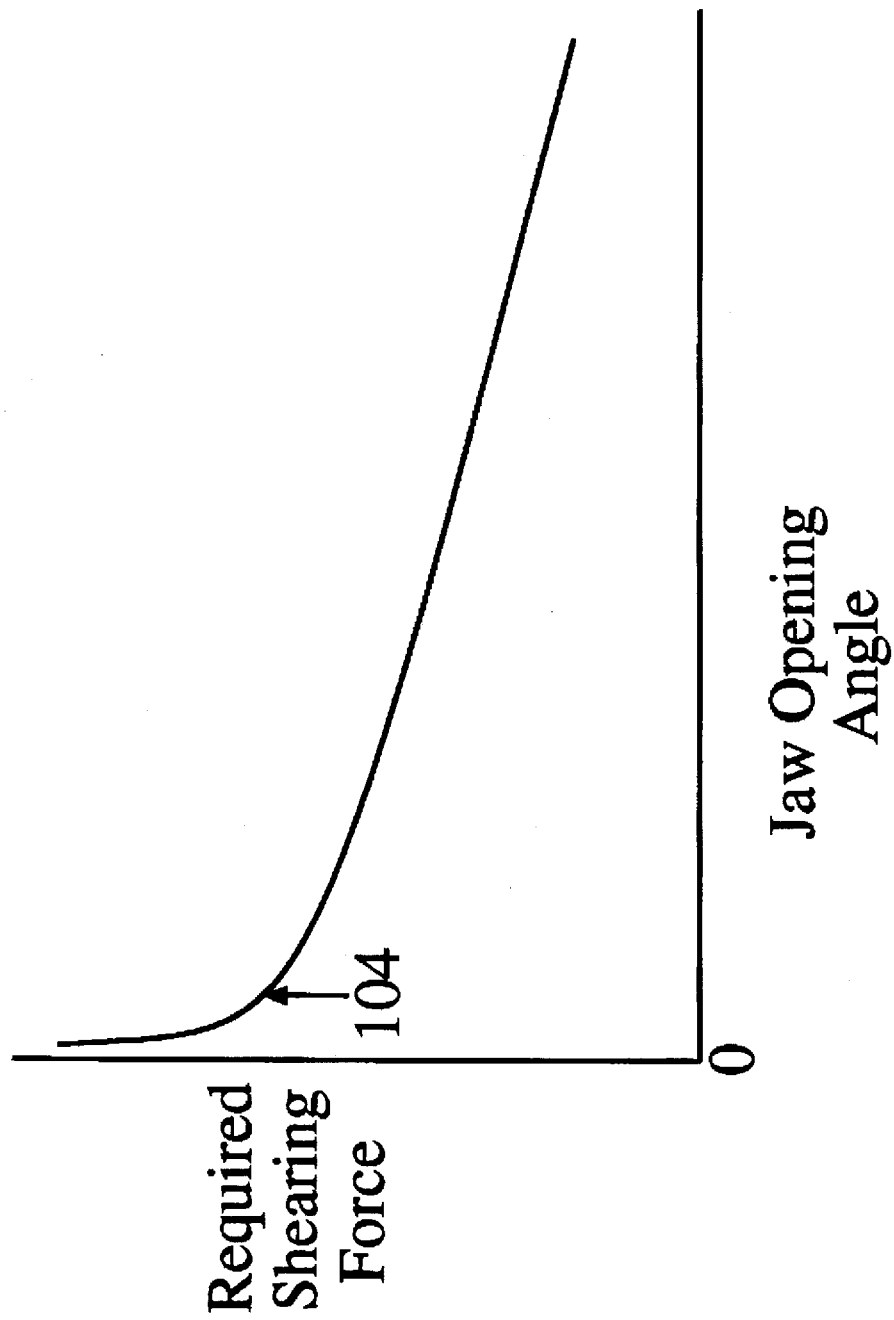
FIG. 8 is a curve showing the increase in required shearing force as the jaws of the shearing machine of FIG. 2 are closed.

It will be noted that the maximum shearing force required by the present invention, as shown in FIG. 15, is substantially lower than the maximum shearing force required by the prior art device, as shown in FIG. 8. Part of this improvement arises because of the release of shearing forces produced by upward steps 69 and 71, and partly because of the control of shearing angles during all phases of shearing by selection of distances D1, D2 and D3, as well as of tilt angles a1, a2 and a3. The reduced maximum shearing force permits a reduction in the size and cost of an actuating cylinder, as well as in the size and cost of support structure for the actuating cylinder and shearing blades.

Since the prior art is innocent of vertical steps at adjacent ends of shearing blades, it is also silent about longitudinal clearances in these regions.

Although the present invention is described above in connection with an embodiment having three shearing zones at distances D1, D2 and D3 from a reference line, and with shearing edges at tilt angles a1, a2 and a3, other embodiments of the invention are contemplated, and should be considered to be part of the present invention. For example, an embodiment of the invention having only two shearing blades on its upper and lower jaws may be considered to fall within the spirit and scope of the invention. In this embodiment, distances D1 and D2, combined with tilt angles a1 and a2 are selected to produce the desired shearing angles and upward or downward steps necessary to limit the shearing forces required. In addition, embodiments using more than three shearing zones such as, for example, four, five or more, must be considered to fall within the scope of the invention. In a further embodiment, either the upper or lower jaw may contain two or more shearing blades with shearing edges positioned by distances and tilt angles, while the remaining jaw may have less shearing zones, or may have only a single shearing zone created by its blade or blades being positioned in a common plane.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A steel shearing machine comprising:

an upper jaw and a lower jaw;

means for articulating at least one of said upper jaw and said lower jaw with respect to the other thereof;

an upper leading shearing blade on said upper jaw;

an upper trailing shearing blade on said upper jaw;

a lower leading shearing blade on said lower jaw;

said lower leading shearing blade being engageable with said upper leading shearing blade by said means for articulating;

a lower trailing shearing blade on said lower jaw;

said lower trailing shearing blade being engageable with said upper trailing shearing blade by said means for articulating;

said lower leading shearing blade being displaced in a first direction transversely of a shearing plane, whereby transverse forces acting thereon are directed in a first direction;

said lower trailing shearing blade being displaced in a second direction transversely of said shearing plane, whereby transverse forces acting thereon are directed in a second direction substantially opposite to said first direction, whereby jaw spreading of said upper and lower jaws is prevented;

at least one of said upper leading shearing blade and said lower leading shearing blade having a first shearing edge displaced a first distance from a reference line which reference line is defined as a line extending from an axis of said means for articulating to a tip of said upper leading shearing blade;

said first shearing edge having a first tilt angle with respect to said reference line;

at least one of said upper trailing shearing blade and said lower trailing shearing blade having a second shearing edge displaced a second distance from said reference line;

said second shearing edge having a second tilt angle with respect to said reference line;

said first and second distances and said first and second tilt angles defining a step in a direction away from said reference line between a rear end of the first shearing edge of said at least one leading shearing blade and a forward end of the second shearing edge of said at least one trailing shearing blade; and said step being effective for removing a requirement for providing a shearing force to one of said leading and trailing blades for a portion of jaw closing when shearing passes said step, whereby a maximum required shearing force is reduced.

2. Apparatus according to claim 1 wherein said first and second distances and said first and second tilt angles combine to maintain shearing angles of said first and second shearing edges in a non-parallel configuration at substantially all conditions of opening of said first and second jaws.

3. Apparatus according to claim 1, wherein:

said upper leading and trailing shearing blades and said lower leading and trailing shearing blades are substantially identical;

said upper leading and trailing shearing blades and said lower leading and trailing shearing blades have cross sections which are rectangles;

each of four vertices of each shearing blade rectangle defining a shearing edge; and means for mounting each of said shearing blades to position a selected one of said four vertices in a position useable as said shearing edge, whereby four shearing edges are available per shearing blade.

4. A scissors type steel shearing apparatus comprising:

an upper jaw and a lower jaw;

at least first, second and third upper shearing blades on said upper jaw;

at least first second and third lower shearing blades on said lower jaw;

said shearing blades on said upper jaw interengaging, scissors-wise, with corresponding blades on said lower jaw;

said first upper shearing blade being disposed a first distance above a reference line;

said first upper shearing blade having a first tilt angle with respect to said reference line;

said second upper shearing blade being disposed a second distance above said reference line;

said second upper shearing blade having a second tilt angle with respect to said reference line;

said third upper shearing blade being disposed a third distance above said reference line;

said third upper shearing blade having a third tilt angle with respect to said reference line;

said first, second and third lower shearing blades being disposed at mirror image positions relative to said first, second and third upper shearing blades, on an opposite side of said reference line;

said first and second distances and said first and second tilt angles defining a first step in a direction away from said reference line between respectively, a rear end of a shearing edge and a forward end of a shearing edge of the respective ones of adjacent ends of said first and second upper shearing blades;

said second and third distances and said second and third tilt angles defining a second step in a direction away from said reference line between respectively, a rear end of a shearing edge and a forward end of a shearing edge of the respective ones of adjacent ends of said second and third upper shearing blades; and said first and second steps being positioned and directed to relieve required shearing forces at first and second predetermined portions of a shearing cycle.

5. A steel shearing machine comprising:

an upper jaw;

a lower jaw, at least first and second shearing blades on said upper jaw;

at least third and fourth shearing blades on said lower jaw, interoperable with said first and second shearing blades;

each of said first, second, third and fourth blades including first, second, third and fourth corners; and means for removably mounting said first, second, third and fourth shearing blades on their respective jaws with selected ones of said first, second, third and fourth corners positioned as a shearing edge, said first, second, third and fourth shearing blades and the first, second, third and fourth corners thereof being substantially identical whereby any one of said first, second, third and fourth shearing blades can be interchangeable with any other of said first, second, third and fourth shearing blades.

6. A steel shearing machine comprising:

an upper jaw;

a lower jaw;

at least first and second longitudinally oriented shearing blades on said upper jaw;

said first and second shearing blades being oriented such as to provide a first step between adjacent ends of said first and second shearing blades defined by one of said adjacent ends having a location which is offset relative to a location of a other of the adjacent ends;

a first longitudinal clearance between said adjacent ends of said first and second shearing blades;

at least third and fourth longitudinally oriented shearing blades on said lower jaw, interoperable with said first and second shearing blades, there being a second longitudinal clearance between adjacent ends of said third and fourth shearing blades;

said third and fourth shearing blades being oriented such as to produce a second step between said adjacent ends of said third and fourth shearing blades defined by one of said third and fourth shearing blades adjacent ends having a location which is offset relative to a location of a other of said third and fourth shearing blade adjacent ends; and said first and second longitudinal clearances being generally aligned with each other.

7. A steel shearing machine according to claim 6, wherein said first and second longitudinal clearances are at least 10 millimeters.

8. A steel shearing machine according to claim 6, wherein said first and second longitudinal clearances are from about 10 to about 50 millimeters.

9. A steel shearing machine according to claim 6, wherein said first and second longitudinal clearances are from about 20 to about 30 millimeters.

* * * * *